June 24, 1930.  D. C. ROSENBERG  1,768,296
FRUIT DRYING FRAME
Filed Dec. 12, 1929
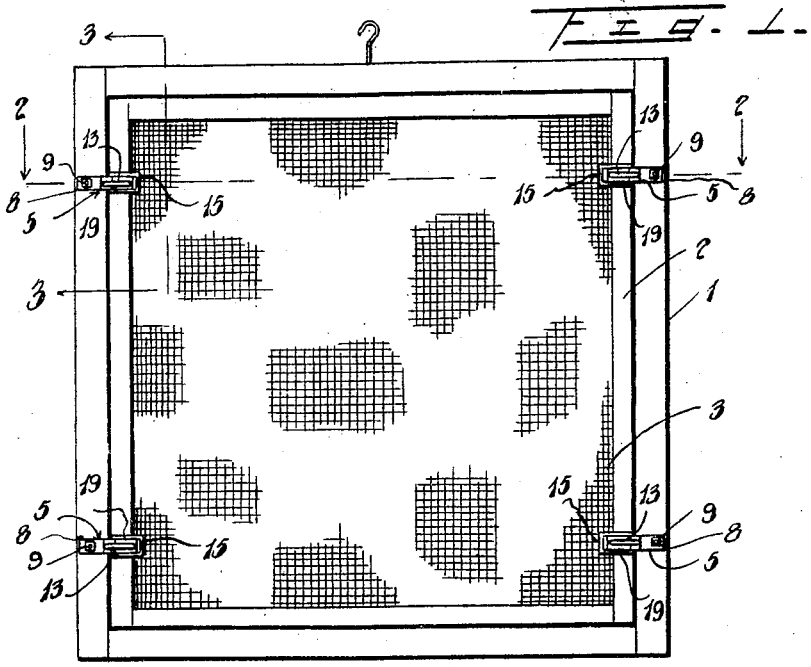
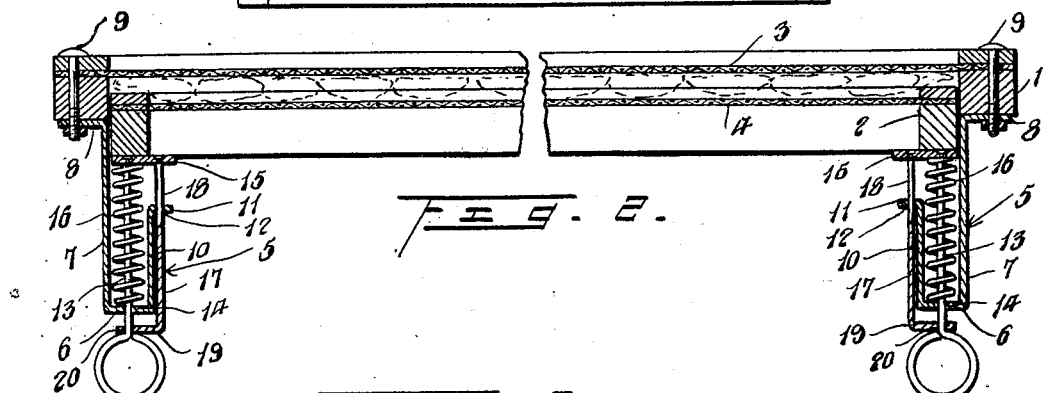
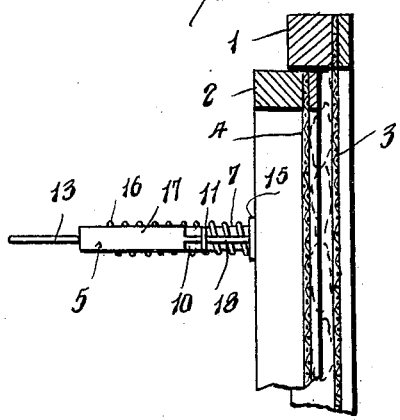
Inventor
D. C. Rosenberg.

Patented June 24, 1930

1,768,296

UNITED STATES PATENT OFFICE

DANIEL C. ROSENBERG, OF SOBIESKI, WISCONSIN

FRUIT DRYING FRAME

Application filed December 12, 1929. Serial No. 413,613.

The invention relates to a frame for holding fruit during the process of drying and has for its principal object the provision of a frame that holds the fruit spread for exposure to the air and provided with means by which the shrinkage of the fruit in drying is automatically offset by automatic movement of one member of the frame relatively to the other to maintain the fruit spaced in the frame at all times.

A further object of the invention is the provision of a fruit drying frame comprising two relatively movable and telescoping frames in which are secured screen panels, and providing resilient means connecting the two frames and to hold them assembled so that the frames automatically move relatively to one another as the drying process proceeds to maintain the frames in such relation as to hold the material spread between the screen panels.

The invention will be described in detail hereinafter and will be found illustrated in the accompanying drawings in which Figure 1 is a front view in elevation of the improved fruit drying frame, Figure 2 is a transverse sectional view on a plane indicated by the line 2—2 of Figure 1, and Figure 3 is a sectional detail on a plane indicated by the line 3—3 of Figure 1.

In the drawings similar reference characters are used to designate corresponding parts throughout the several views.

The fruit drying frame consists of two telescopically related frames designated 1 and 2, respectively, which may be rectangular as shown or any other shape desired. 3 and 4 designate panels of wire screen fabric carried by the frames 1 and 2, respectively, and between which the fruit or other material to be dried is placed and held in relatively spaced relation by engagement between the panels. The two frames are held in assembled relation by means of latch members 5, said latch members each consisting of a U-shaped frame 6 having a relatively long arm 7 provided with an angular flange 8 that is pivotally secured to the frame 1 by means of a bolt or other fastening 9 and a shorter arm 10 having an angular flange 11 provided with an opening 12. 13 indicates a plunger slidably mounted in an opening 14 in the bight of the U-shaped member 6 and having a foot plate 15 secured thereto, engaging the frame 2 and held in engagement therewith by means of a coil spring 16 surrounding the plunger 13 and terminally engaging the foot plate 15 and the bight of the U-shaped member 6 to hold the frame 2 in telescopic relation with the frame 1, the spring pressed foot plate 15 insuring close engagement of the panels 3 and 4 with the fruit therebetween to hold the fruit spaced during the drying process, and also providing for automatically moving the frames 1 and 2 relatively to one another as drying of the fruit progresses to maintain the material in spaced relations at all times. The latching means also includes an angular guide member 17 having a reduced extension 18 that extends through the opening 12 and is terminally secured to the foot plate 15 to move therewith, the member 17 having an angular offset portion 19 provided with an opening 20 through which the plunger 13 extends.

What is claimed is:—

1. A fruit drying frame, comprising telescoping screen frames adapted to receive fruit for drying therebetween, and resilient means holding the frames in assembled relation and providing means for spacing the frames to accommodate the thickness of material therebetween and for automatically reducing the space between the frames during the drying process.

2. A fruit drying frame, comprising telescoping screen frames adapted to receive fruit for drying therebetween, and resilient means for holding the frames in assembled relation.

3. A fruit drying frame, comprising telescoping screen frames adapted to receive fruit for drying therebetween, latch means pivotally secured to the outer of said frames, and resilient means mounted on said latch means engaging the inner of said frames and compressing the material between the frames.

In testimony whereof I affix my signature.

DANIEL C. ROSENBERG.